(12) United States Patent
Corn et al.

(10) Patent No.: US 7,916,311 B2
(45) Date of Patent: Mar. 29, 2011

(54) METHOD AND SYSTEM FOR INSPECTING BLADE TIP CLEARANCE

(75) Inventors: Randall Stephen Corn, Travelers Rest, SC (US); George Frederick Frey, Houston, TX (US); Andrew Thomas Hynous, Camanche, IA (US); Gregory M. Valente, Greenville, SC (US)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 12/262,815

(22) Filed: Oct. 31, 2008

(65) Prior Publication Data

US 2010/0110450 A1 May 6, 2010

(51) Int. Cl.
G01B 11/14 (2006.01)

(52) U.S. Cl. .................................. 356/625; 356/614

(58) Field of Classification Search ............ 356/604–625
See application file for complete search history.

(56) References Cited

U.S. PATENT DOCUMENTS

| | | | |
|---|---|---|---|
| 4,357,104 A * | 11/1982 | Davinson | 356/4.07 |
| 4,596,460 A * | 6/1986 | Davinson | 356/3.06 |
| 4,765,742 A * | 8/1988 | Davinson | 356/624 |
| 5,203,673 A | 4/1993 | Evans | |
| 5,739,524 A | 4/1998 | Fally | |
| 6,575,011 B1 | 6/2003 | Busby et al. | |
| 6,678,060 B2 | 1/2004 | Heyworth | |
| 6,717,418 B2 | 4/2004 | Orenstein | |
| 6,863,495 B2 | 3/2005 | Halliwell et al. | |
| 7,086,233 B2 | 8/2006 | Chehab et al. | |
| 7,341,426 B2 | 3/2008 | Schwartz et al. | |
| 7,388,680 B2 * | 6/2008 | Heyworth | 356/630 |
| 7,465,145 B2 | 12/2008 | Kane | |
| 2005/0089401 A1 | 4/2005 | Phipps | |
| 2007/0005294 A1 | 1/2007 | Andarawis et al. | |
| 2008/0089775 A1 | 4/2008 | Lee et al. | |
| 2008/0149049 A1 | 6/2008 | Mollmann et al. | |
| 2008/0206039 A1 | 8/2008 | Kane | |
| 2008/0218181 A1 * | 9/2008 | Ducheminsky et al. | 324/662 |
| 2008/0267769 A1 | 10/2008 | Schwartz et al. | |

OTHER PUBLICATIONS

EPO Foreign Search Report dated Feb. 26, 2010 for application No. 09174105.8-2213.

* cited by examiner

*Primary Examiner* — Michael P Stafira
(74) *Attorney, Agent, or Firm* — Armstrong Teasdale LLP

(57) ABSTRACT

A method for inspecting blade tip clearance between at least one rotor blade and a case spaced radially outward from the rotor blade is provided. The method includes inserting a probe into an aperture defined in the case and emitting electromagnetic energy into the case using the probe. The method also includes detecting electromagnetic energy reflected from a blade tip portion of the rotor blade and determining a blade tip clearance defined between the blade tip and the case based on the detected electromagnetic energy.

14 Claims, 3 Drawing Sheets

METHOD AND SYSTEM FOR INSPECTING BLADE TIP CLEARANCE

BACKGROUND OF THE INVENTION

The field of this disclosure relates generally to the inspection of rotor blade tips and, more particularly, to a method and a system for use in inspecting blade tip clearance in a turbine engine.

At least some known turbine engines include a rotor assembly including a plurality of rows of rotor blades. Each rotor blade extends radially outward from a blade platform to a tip, and a flow path casing extends substantially circumferentially around the rotor assembly, such that a tip clearance is defined between each respective rotor blade tip and the casing. The tip clearance is designed to be a minimum, while being sized large enough to facilitate rub-free engine operation through a range of available engine operating conditions. During operation, engine performance may be influenced by the tip clearance between the rotor blade tips and the casing. Specifically, if the clearance increases, leakage across the rotor blade tips may adversely limit the performance of the engine.

Accordingly, it is often desirable to inspect the clearance between the casing and the rotor blade tips in a turbine engine to assess performance characteristics of the engine. In at least some known clearance inspection systems, the tip clearance of each rotor blade is measured manually. Such inspection techniques are time consuming and may be unreliable because of variability in measurements from operator to operator due to different measuring devices and/or different clearance inspection techniques.

Moreover, because of the increased time required to manually inspect the engine and because of the high degree of variability possible in clearance measurements performed by different operators, the quality of at least some known engine performance data may be insufficient to make fundamental engineering decisions that are required to optimize engine performance and energy output. In that regard, operating an engine at less than optimal performance may adversely impact operating revenues and may increase maintenance costs.

BRIEF DESCRIPTION OF THE INVENTION

In one aspect, a method for inspecting blade tip clearance between at least one rotor blade and a case spaced radially outward from the rotor blade is provided. The method includes inserting a probe into an aperture defined in the case and emitting electromagnetic energy into the case using the probe. The method also includes detecting electromagnetic energy reflected from a blade tip portion of the rotor blade and determining a blade tip clearance defined between the blade tip and the case based on the detected electromagnetic energy.

In another aspect, a system for inspecting blade tip clearance between a plurality of rotatable blades and a case spaced radially outward from the plurality of rotatable blades is provided. The system includes an inspection apparatus including a probe sized for insertion into an aperture defined in the case, the probe configured to detect electromagnetic energy reflected from at least one blade tip portion of at least one of the plurality of blades. The system also includes a control unit coupled in communication with the probe, the control unit configured to receive at least one signal indicative of a detected electromagnetic energy from the probe.

In another aspect, a blade tip clearance inspection apparatus is provided. The apparatus includes a probe configured to detect electromagnetic energy. The apparatus also includes a probe holder including a probe sheath formed integrally with a base. The probe sheath has a first outer diameter, and the base has a second outer diameter, wherein a mating surface extends between the probe sheath and the base, and a cavity extends through the probe sheath and the base, the probe being positioned within the cavity.

DETAILED DESCRIPTION OF THE INVENTION

The following detailed description illustrates exemplary methods and systems for inspecting blade tip clearance by way of example and not by way of limitation. The description should clearly enable one of ordinary skill in the art to make and use the disclosure, and the description describes several embodiments, adaptations, variations, alternatives, and uses of the disclosure, including what is presently believed to be the best mode of carrying out the disclosure. The disclosure is described herein as being applied to a preferred embodiment, namely, methods and systems for inspecting compressor blade tip clearance in a gas turbine engine. However, it is contemplated that this disclosure has general application in a broad range of systems and/or a variety of other commercial, industrial, and/or consumer applications.

Figure 1:
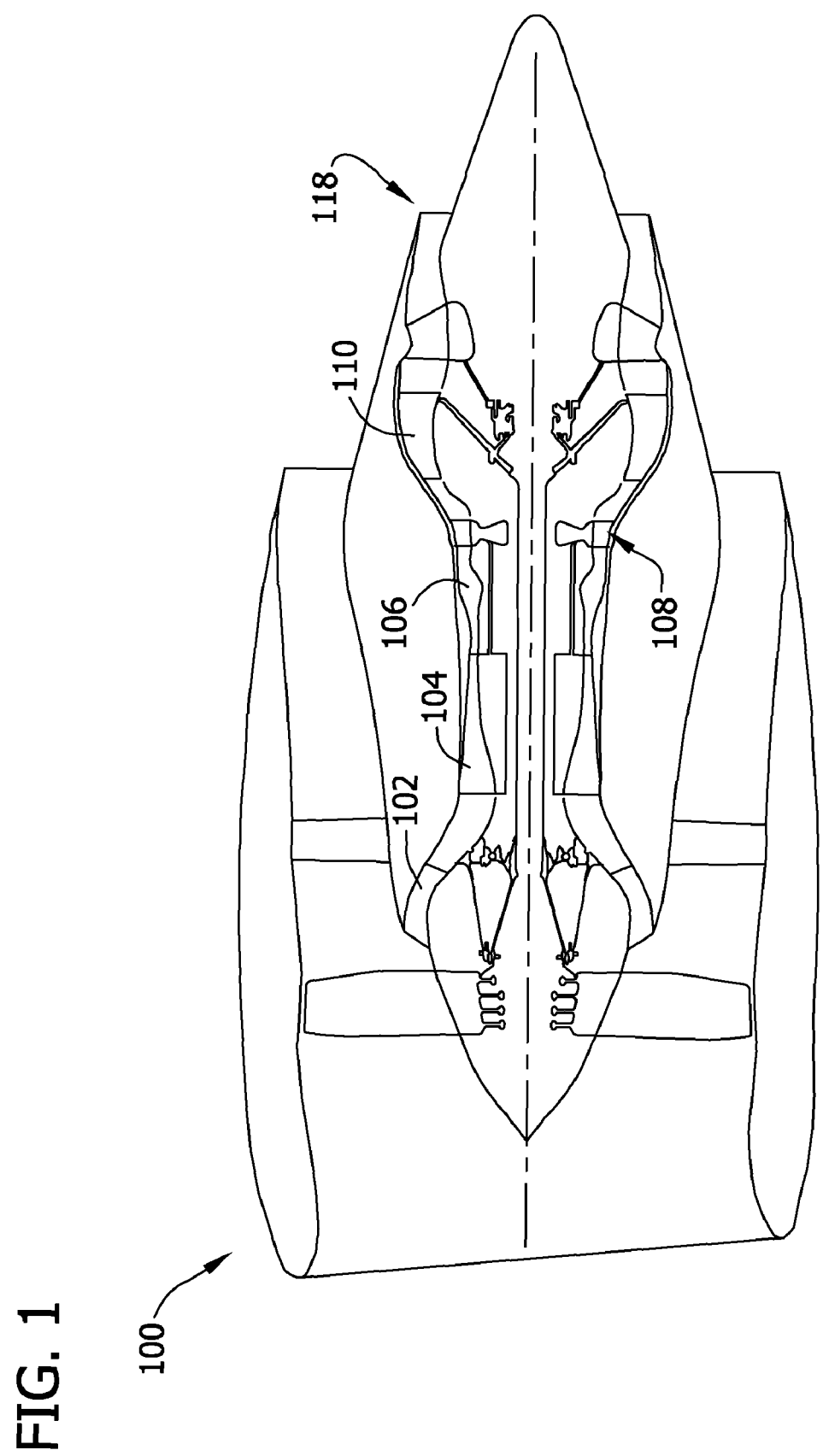
FIG. 1 is a schematic illustration of an exemplary gas turbine engine.

FIG. 1 is a schematic illustration of an exemplary gas turbine engine 100 including a fan assembly 102, a high pressure compressor 104, and a combustor 106. Engine 100 also includes a high pressure turbine 108 and a low pressure turbine 110. In operation, air flows through fan assembly 102 and compressed air is supplied from fan assembly 102 to high pressure compressor 104. The highly compressed air is delivered to combustor 106. Airflow from combustor 106 drives rotating turbines 108 and 110 and exits gas turbine engine 100 through an exhaust system 118.

Figure 2:
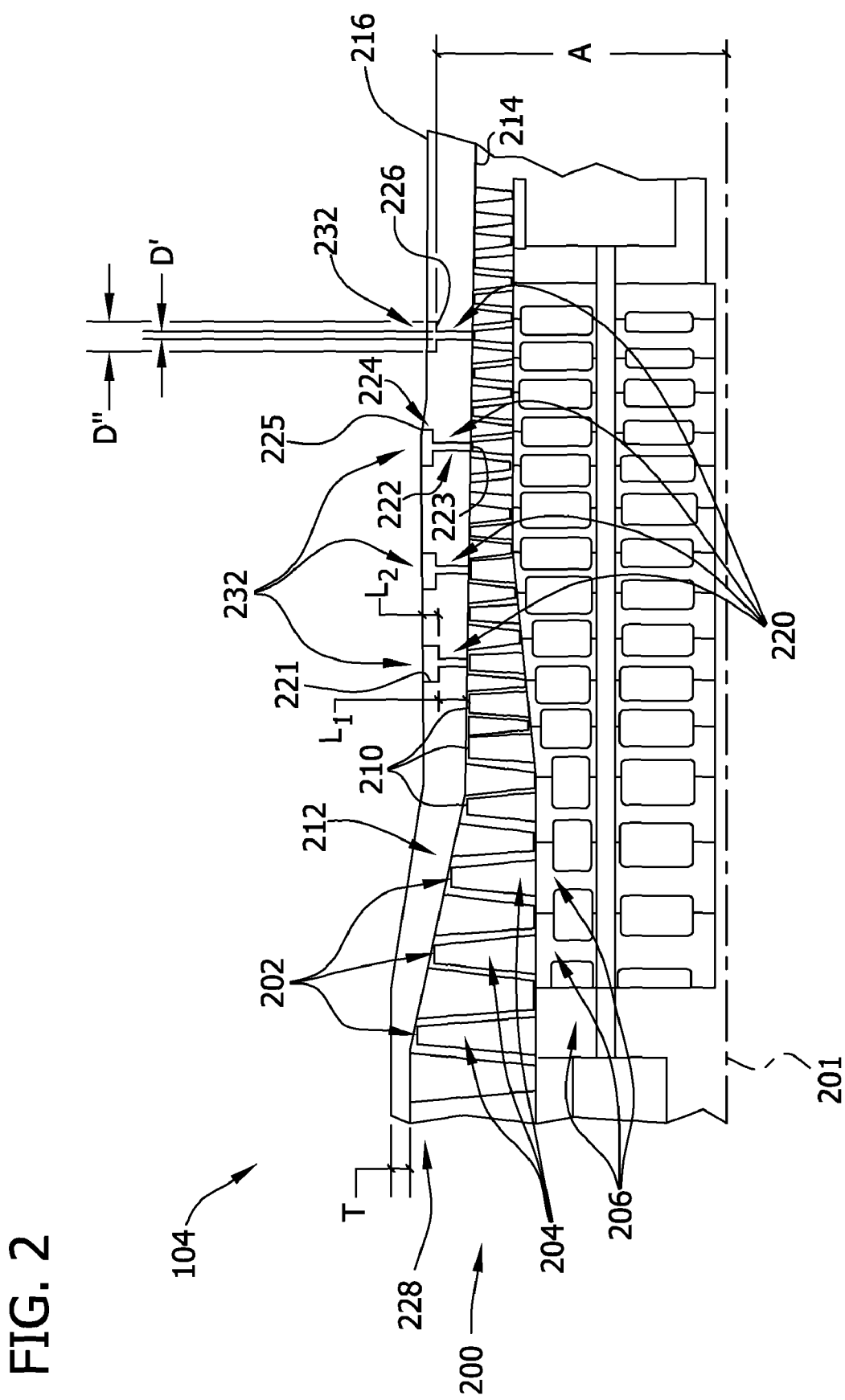
FIG. 2 is a cross-sectional view of an exemplary compressor for use in the gas turbine engine shown in FIG. 1.

FIG. 2 is a cross-sectional view of a portion of a compressor that may be used within engine 100 (shown in FIG. 1), such as, but not limited to, high pressure compressor 104. In the exemplary embodiment, compressor 104 includes a flow path 200 that extends through a plurality of compressor stages 202 that are oriented in an axial alignment along a centerline axis 201 extending through compressor 104. Each stage 202 includes a plurality of rotor blades 204 that are coupled to, and spaced circumferentially about, a rotor disk 206 using any suitable attachment configuration (e.g., a "dovetail" configuration). Each compressor rotor blade 204 has a tip 210.

A casing 212 circumscribes stages 202 and forms an outer periphery of flow path 200. Casing 212 includes an inner surface 214 and an outer surface 216. In an exemplary embodiment, casing 212 is fabricated from a plurality of casing segments (not shown) that are coupled together. In one embodiment, casing 212 is assembled by coupling together two casing segments to form a joint (not shown) on opposing sides thereof. In another embodiment, casing 212 is assembled from any number of casing segments. Alternatively, casing 212 may be formed unitarily, as a one-piece unit. In an exemplary embodiment, casing 212 circumscribes rotor blades 204 and is positioned in close proximity thereto, such that a blade tip clearance 218 (shown in FIG. 3) is defined between casing inner surface 214 and each blade tip 210.

In an exemplary embodiment, casing 212 includes at least one aperture 220 defined therein and extending therethrough. Each aperture 220 includes an inner surface 221, a first portion 222 (e.g., a bore) having a first end 223 defined in casing inner surface 214, and a second portion 224 (e.g., a counterbore) having a second end 225 defined in casing outer surface 216. First portion 222 is formed with a first length $L_1$ and a first diameter D', and second portion 224 is formed with a second length $L_2$ and a second diameter D" that is larger than first diameter D'. In one embodiment, first diameter D' is smaller than about 0.400 inches. Alternatively, first diameter D' may have any length that enables aperture 220 to function as described herein. In an exemplary embodiment, first portion 222 intersects second portion 224 at a first mating surface 226. In one embodiment, casing 212 has a thickness T that varies along centerline axis 201. Second length $L_2$ varies along centerline axis 201 with thickness T such that a predetermined distance A is maintained between first mating surface 226 and centerline axis 201. In an exemplary embodiment, first mating surface 226 is substantially planar. Alternatively, first mating surface 226 may have any suitable contour that enables casing 212 to function as described herein.

Each aperture 220 provides access to an interior cavity 228 defined within casing 212 and thus facilitates an inspection of blade tip clearance 218. In an exemplary embodiment, apertures 220 are spaced circumferentially about casing 212, and at least some apertures 220 are substantially aligned with each of a plurality of desired inspection stages 232 to enable a blade tip clearance 218 defined at each desired inspection stage 232 to be inspected. For example, in one embodiment, a plurality of apertures 220 are aligned with each of four desired inspection stages 232 (i.e., there are four sets of apertures 220). Alternatively, any number of sets of apertures 220 may be aligned with any number of desired inspection stages 232. In an exemplary embodiment, each set of apertures 220 includes four apertures 220 that are spaced circumferentially about casing 212. Alternatively, each set of apertures 220 may include any number of circumferentially-spaced apertures 220.

Figure 3:
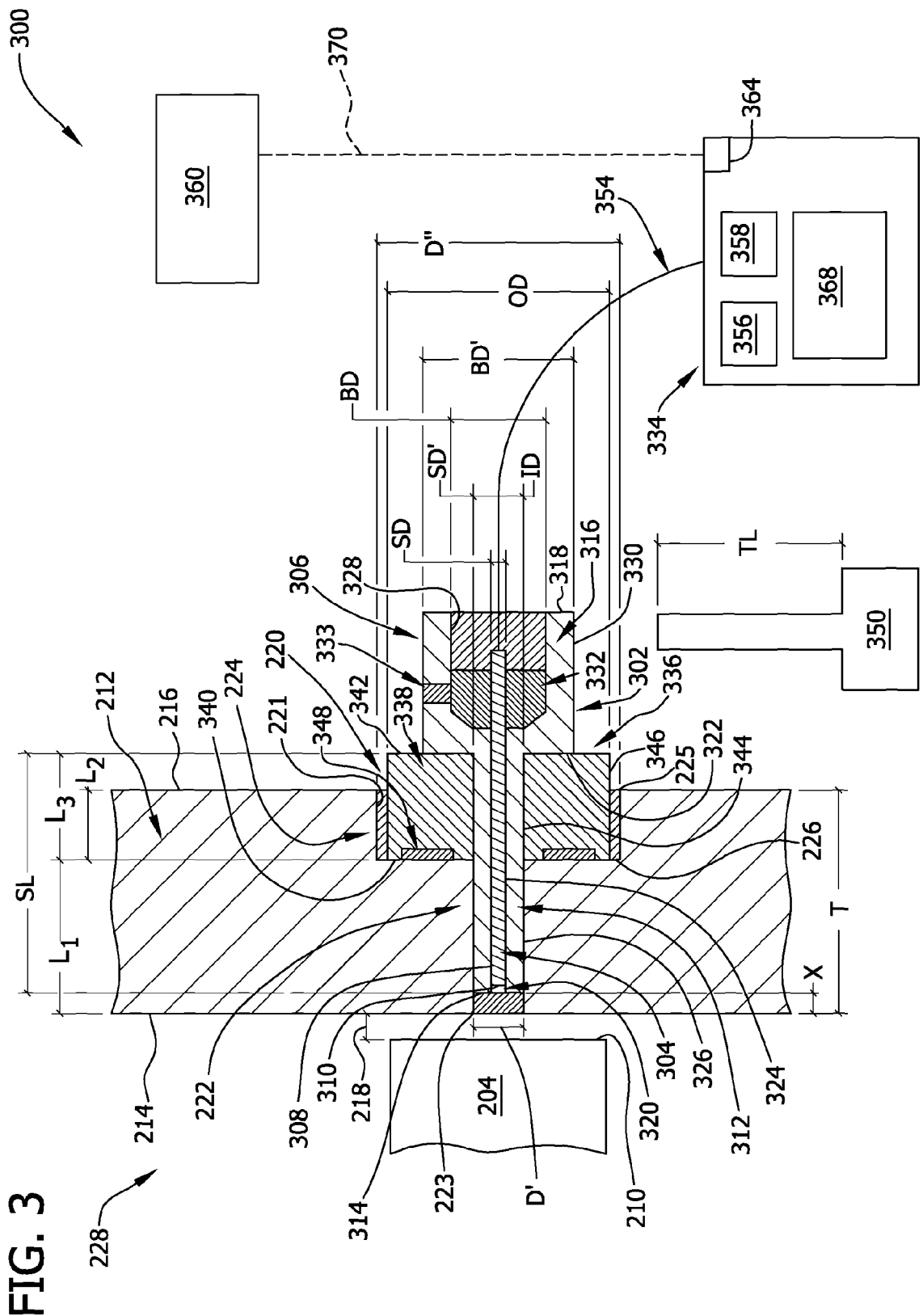
FIG. 3 is a partial cross-sectional view of an exemplary system that may be used to inspect a blade tip clearance in the compressor shown in FIG. 2.

FIG. 3 is cross-sectional view of an exemplary system 300 that may be used to inspect a blade tip clearance 218 defined in a rotor assembly, such as high pressure compressor 104 (shown in FIG. 2). In an exemplary embodiment, system 300 includes an inspection apparatus 302 including a probe 304 and a probe holder 306. Probe 304 includes an elongated body 308 that includes a tip 310 having a source for emitting electromagnetic energy and a detector (e.g., a sensor) for detecting reflected electromagnetic energy. Alternatively, body 308 may have any shape, and source and/or detector may be located anywhere relative to inspection apparatus 302 that enables inspection apparatus 302 to function as described herein. In one embodiment, probe 304 is an optical probe that emits and/or detects light (e.g., white light). In another embodiment, probe 304 may emit and/or detect any wavelength of electromagnetic energy. In one embodiment, probe 304 generates up to about 2,000 electromagnetic energy readings (i.e., emissions and/or detections) per second.

In the exemplary embodiment, probe holder 306 includes a generally cylindrical probe sheath 312 that has an end 314, a generally cylindrical base 316 having an end 318, and a cavity 320 that extends from sheath end 314 to base end 318. Alternatively, either base 316 and/or sheath 312 may have any shape and are not limited to cylindrical shapes. In an exemplary embodiment, sheath 312 and base 316 are integrally formed together to form a second mating surface 322 that is substantially planar. Alternatively, second mating surface 322 may be formed with any contour that enables system 300 to function as described herein. Sheath 312 has a length SL that extends from second mating surface 322 to sheath end 314. Sheath 312 also includes an inner surface 324 that is formed with an inner diameter SD, and an outer surface 326 that is formed with an outer diameter SD'. Base 316 includes an inner surface 328 that is formed with an inner diameter BD and an outer surface 330 that is formed with an outer diameter BD'. In an exemplary embodiment, sheath inner diameter SD is smaller than base inner diameter BD, and sheath outer diameter SD' is smaller than base outer diameter BD'. Alternatively, in another embodiment, sheath inner diameter SD may be larger than, or approximately the same size as, base inner diameter BD, and/or sheath outer diameter SD' may be larger than, or approximately the same size as, base outer diameter BD'. As used herein, the term "diameter" is defined as a distance across any cross-sectional shape (e.g., a rectangle, a triangle, etc.) and is not limited to only describing a distance across circular or elliptical cross-sectional shapes.

In an exemplary embodiment, probe 304 is housed within sheath 312 (i.e., probe 304 is positioned in cavity 320) such that probe tip 310 is adjacent to sheath end 314 and such that sheath inner surface 324 contacts probe 304 to facilitate stabilizing probe 304 within cavity 320. In one embodiment, probe holder 306 includes a probe socket 332 that provides power to probe 304, electrically couples probe 304 to a control unit 334, and/or enables a user to adjust a position of probe 304 within probe holder 306. In one embodiment, probe holder 306 includes a locking mechanism 333 that enables a user to securely couple and/or selectively release probe 304 from within probe socket 332 and/or probe holder 306.

To inspect blade tip clearance 218 using inspection apparatus 302, at least a portion of probe 304 and probe holder 306 are inserted into aperture 220. In the exemplary embodiment, aperture first portion 222 engages sheath 312 to facilitate stabilizing sheath 312 therein. More specifically, in the exemplary embodiment, sheath 312 is inserted into aperture first portion 222 such that sheath end 314 does not extend through aperture first end 223 to facilitate preventing inspection apparatus 302 from damaging rotor blades 204. Moreover, in another embodiment, sheath 312 is inserted into aperture first portion 222 such that a predetermined distance X is maintained between sheath end 314 and aperture first end 223. In an exemplary embodiment, distance X is approximately 0.100 inches. Alternatively, distance X may be any length that enables inspection apparatus 302 to function as described herein.

In the exemplary embodiment, system 300 includes a spacer 336 that is positioned between first mating surface 226 and second mating surface 322 to facilitate maintaining distance X. Spacer 336 has a body 338 that is defined by a first end 340 and a second end 342. A passage 344 extends through body 338 from first end 340 to second end 342. Body 338 has a length $L_3$, an inner diameter ID that is longer than sheath outer diameter SD' to enable sheath 312 to be inserted through passage 344, and an outer diameter OD that is shorter than aperture second diameter D" to enable spacer 336 to be inserted into aperture second portion 224. In one embodiment, spacer outer diameter OD is substantially the same length as aperture second diameter D" such that an outer surface 346 of spacer 336 slidably contacts inner surface 221 of aperture second portion 224 when spacer 336 is inserted within aperture 220. In the exemplary embodiment, spacer first end 340 and spacer second end 342 are substantially planar such that spacer first end 340 is positioned substantially flat against first mating surface 226 and such that spacer second end 342 is positioned substantially flat against second mating surface 322 when spacer 336 is inserted within aperture 220 between casing 212 and inspection apparatus 302. Spacer 336 may include at least one magnet 348 adjacent to spacer first end 340 and/or to spacer second end 342 to enable spacer 336 to be removably coupled to first mating surface 226 and/or to second mating surface 322. In an exemplary embodiment, spacer body length $L_3$ is longer than second length $L_2$ of aperture second portion 224 to facilitate maintaining distance X.

Alternatively, system 300 includes a plurality of different spacers 336, wherein at least one spacer 336 is positioned for each desired inspection stage 232 (shown in FIG. 2), such that distance X is facilitated to be maintained despite variations in casing thickness T at each desired inspection stage 232. For example, in an exemplary embodiment, system 300 includes three different spacers 336 that are each fabricated with a different length $L_3$ that facilitates their use at a particular desired inspection stage 232. In another alternative embodiment, system 300 does not include any spacers 336, and probe holder 306 is inserted into aperture 220 such that first mating surface 226 and second mating surface 322 are positioned substantially flat against one another.

In the exemplary embodiment, to facilitate reducing a possibility that inspection apparatus 302 will damage rotor blades 204 (shown in FIG. 2), system 300 includes a test probe 350 that is inserted into aperture 220 before inspection apparatus 302 is inserted into aperture 220. Test probe 350 is fabricated with a length TL that is approximately the same as sheath length SL. In an exemplary embodiment, to facilitate preventing damage to rotor blades 204, test probe 350 is fabricated from a material that has a shearing strength of about 3,380 pounds per square inch (psi) (e.g., a high density polyethylene or a nylon material). Such a shearing strength ensures that test probe 350 will shear upon impact with rotor blades 204. In another embodiment, test probe 350 is fabricated from a material that has a shearing strength of less than about 4,000 psi.

System 300 also includes a probe control unit 334 that is communicatively coupled to probe 304 (e.g., via electric wiring 354, a wireless system, and/or any other suitable communication medium). Control unit 334 includes a control unit memory 356 and a control unit controller 358 that communicates with probe 304, communicates with a computer system 360, and/or enables data to be stored in control unit memory 356. As used herein, the term controller may include any processor-based or microprocessor-based system that includes microcontrollers, reduced instruction set circuits (RISC), application-specific integrated circuits (ASICs), logic circuits, and any other circuit or processor that is capable of executing the functions described herein. The examples provided above are exemplary only, and are not intended to limit in any way the definition and/or meaning of the term controller. Control unit 334 includes at least one communication device (e.g., a universal serial bus (USB) port 364, a wireless receiving/transmitting device, etc.) to communicate with computer system 360.

In one embodiment, control unit 334 is a handheld unit. Alternatively, control unit 334 may have any suitable size, shape, and/or mechanical configuration (e.g., wheels) that enables control unit 334 to be transported by a user from one inspection location to another inspection location. As used herein, the term "inspection location" refers to a location of each aperture 220 at each desired inspection stage 232. Control unit 334 may be powered using any suitable power source, across any suitable medium, such as battery power or hardwiring, for example. In the exemplary embodiment, control unit 334 includes at least one display 368 for displaying a user interface. Display 368 may utilize various display technologies, including, but not limited to, liquid crystal display (LCD), plasma, cathode ray tube (CRT), or analog-type display technologies. Display 368 displays information and/or at least one data entry field associated with a blade tip clearance 218 inspection operation (e.g., a stage number data entry field, a casing thickness data entry field, and/or an aperture number data entry field). In an exemplary embodiment, control unit 334 is programmed to transmit and/or receive signals from the source and/or the detector that are indicative of emitted and/or detected electromagnetic energy. In an exemplary embodiment, control unit controller 358 is programmed to process the signals received from probe 304, generate at least one blade tip clearance reading, and/or store, in control unit memory 356, at least one record for each reading that occurs during a given operational period.

In the exemplary embodiment, computer system 360, or any component thereof, is located remotely from control unit. System 360 may include a computer, an input device, a display unit, and an interface, for example, to access the Internet. Computer system 360 may also include a processor, which may be coupled to a communication bus. The computer may include a memory, which may include a Random Access Memory (RAM) and a Read Only Memory (ROM), as well as a storage device, which may be a hard disk drive or a removable storage drive such as a floppy disk drive, an optical disk drive, and so forth. The storage device is configured to load computer programs and/or other instructions into the computer system. As used herein, the term "processor" is not limited to only integrated circuits referred to in the art as a processor, but broadly refers to a computer, a microcontroller, a microcomputer, microprocessor, a programmable logic controller, an application specific integrated circuit and any other programmable circuit.

Computer system 360 executes instructions, stored in one or more storage elements, to process input data. The storage elements may also hold data or other information, as desired or required, and may be in the form of an information source or a physical memory element in the processing machine. The set of instructions may include various commands that instruct the computer system to perform specific operations, such as the processes of a method. The set of instructions may be in the form of a software program. The software may be in various forms, such as system software or application software. Further, the software may be in the form of a collection of separate programs, a program module within a larger program, or a portion of a program module. The software may also include modular programming in the form of object-oriented programming. The processing of input data by the processing machine may be in response to user commands, to results of previous processing, or to a request made by another processing machine.

As used herein, the term 'software' includes any computer program that is stored in the memory, to be executed by a computer, which includes RAM memory, ROM memory, EPROM memory, EEPROM memory, and non-volatile RAM (NVRAM) memory. The memory types mentioned above are only exemplary and do not limit the types of memory used to store computer programs.

In an exemplary embodiment, control unit 334 communicates with computer system 360 (i.e., via any suitable communication device and/or communication medium 370, such as, for example, a copper cable, a fiber optic cable, a radio frequency or other method of wireless communication, and/or any combination thereof). In one embodiment, computer system 360 is programmed to receive at least one record from control unit 334, store the records in the computer system memory, process the records, and/or output blade tip clearance data to a user (i.e. statistical data via a spreadsheet) using the records. In another embodiment, computer system 360 outputs at least the following data: (1) inspection location stage number; (2) inspection location aperture number; (3) inspection location casing thickness; (4) probe electromagnetic emission/detection frequency; (5) number of electromagnetic records (i.e., emissions/detections) collected for each rotor blade at each inspection location; (6) average blade tip clearance for each rotor blade at each inspection location; and/or (7) average blade tip clearance for all rotor blades at each desired inspection stage. In an alternative embodiment, system 300 does not include computer system 360, and control unit 334 is configured to perform the operations of computer system 360, as described herein.

In an exemplary embodiment, system 300 includes an electric rotating device (not shown) (e.g., an electric turn gear) for rotating rotor blades 204 during an inspection operation. In one embodiment, the rotating device rotates rotor blades 204 at approximately seven revolutions per minute (rpm) during an inspection operation. In another embodiment, the rotating device may rotate rotor blades 204 at any rotational speed. During rotation of rotor blades 204, a user inserts inspection apparatus 302 into casing 212 at each inspection location. Prior to inserting inspection apparatus 302 in a desired aperture 220, the user inputs inspection location data into control unit user interface 368 (e.g., inspection location stage number, inspection location aperture number, inspection location casing thickness, etc.). After entering inspection location data, the user inserts spacer 336 into aperture second portion 224 and inserts test probe 350 through spacer 336 and into aperture first portion 222 to determine if the proper spacer 336 has been selected. If test probe 350 contacts rotor blades 204, the user inserts a different spacer 336 that has a different length $L_3$ into aperture second portion 224 and reinserts test probe 350 through spacer 336 and into aperture first portion 222 to determine whether test probe 350 contacts rotor blades 204. Once the user identifies the proper spacer 336 that prevents test probe 350 from contacting rotor blades 204, the user removes test probe 350 from spacer 336 and inserts inspection apparatus 302 (i.e., probe 304 and sheath 312) through spacer 336 and into aperture first portion 222.

After inserting inspection apparatus 302 through spacer 336 and into aperture first portion 222, the user instructs control unit 334 to begin a blade tip clearance inspection operation of blade tip clearance 218 (i.e., by interacting with user interface 368). Control unit 334 and probe 304 transmit and/or receive signals that are indicative of electromagnetic energy emitted and/or received by probe 304. Control unit 334 stores a plurality of blade tip clearance records for each blade 204 at a particular inspection location (e.g., control unit 334 may store about fifteen records per blade 204 for each inspection location). After inspecting blade tip clearance 218 at each inspection location, control unit 334 transmits each record stored during the inspection operation to computer system 360, and computer system 360 stores the records and outputs blade tip clearance data to the user.

The methods and systems described herein facilitate inspecting gas turbine engine compressor rotor blade tip clearance. More specifically, the methods and systems described herein facilitate minimizing variability in blade tip clearance measurements by providing automated and repeatable inspection techniques, such that an engine performance data quality increases to enable fundamental engineering decisions to be made regarding optimizing engine performance and energy output. Moreover, the methods and systems described herein facilitate reducing engine inspection cycle time, thereby decreasing inspection costs.

As will be appreciated by one skilled in the art and based on the foregoing specification, the above-described embodiments of the invention may be implemented using computer programming or engineering techniques including computer software, firmware, hardware, or any combination or subset thereof, wherein one technical effect is to facilitate inspecting blade tip clearance. Any resulting program, having computer-readable code means, may be embodied or provided within one or more computer-readable media, thereby making a computer program product (i.e., an article of manufacture, according to the discussed embodiments of the invention). The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, and/or by transmitting the code over a network.

Exemplary embodiments of methods and systems for inspecting blade tip clearance are described above in detail. The methods and systems for inspecting blade tip clearance are not limited to the specific embodiments described herein, but rather, components of the methods and systems may be utilized independently and separately from other components described herein. For example, the methods and systems described herein may have other industrial and/or consumer applications and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method for inspecting blade tip clearance between at least one rotor blade and a case spaced radially outward from the rotor blade, said method comprising:
   inserting a probe into an aperture defined in the case, wherein a spacer is removably inserted within the aperture between the probe and the case;
   emitting electromagnetic energy into the case using the probe;
   detecting electromagnetic energy reflected from a blade tip portion of the rotor blade; and
   determining a blade tip clearance defined between the blade tip and the case based on the detected electromagnetic energy.

2. A method in accordance with claim 1, wherein the probe is an optical probe, said inserting a probe into an aperture comprises inserting the optical probe into the aperture while the optical probe is coupled to at least a portion of a probe holder.

3. A method in accordance with claim 1, wherein said inserting the probe into the aperture further comprises:
   inserting the probe into the aperture through a passage defined in the spacer while the probe is coupled to a probe holder.

4. A method in accordance with claim 3, wherein said inserting the probe into the aperture comprises inserting at least a portion of the probe and the probe holder through the passage until a portion of the probe holder contacts the spacer.

5. A method in accordance with claim 4, further comprising rotating the blade using an electric rotating device.

6. A method in accordance with claim 5, wherein said inserting the probe into the aperture further comprises inserting a test probe into the aperture before inserting the probe into the aperture.

7. A method in accordance with claim 1, wherein said determining a blade tip clearance comprises:
receiving, at a control unit coupled in communication with the probe, signals indicative of the detected electromagnetic energy;
receiving, at a computer system from the control unit, at least one record; and
outputting, using the computer system, blade tip clearance data using the at least one record.

8. A system for inspecting blade tip clearance between a plurality of rotatable blades and a case spaced radially outward from the plurality of rotatable blades, said system comprising:
an inspection apparatus comprising a probe sized for insertion into an aperture defined in the case, said probe configured to detect electromagnetic energy reflected from at least one blade tip portion of at least one of the plurality of blades;
a spacer removably coupled within the aperture such that said spacer extends circumferentially between said probe and the case, said spacer sized to receive said at least a portion of said probe therethrough; and
a control unit coupled in communication with said probe, said control unit configured to receive at least one signal indicative of a detected electromagnetic energy from said probe.

9. A system in accordance with claim 8, wherein said probe is an optical probe, said inspection apparatus further comprising a probe holder, said optical probe coupled to said probe holder such that at least a portion of said optical probe and said probe holder are insertable into the case aperture.

10. A system in accordance with claim 8, wherein said spacer comprises at least one magnet configured to removably couple said spacer to the case.

11. A system in accordance with claim 9, wherein said probe holder comprises a mating surface that contacts said spacer when said probe holder is inserted through said spacer passage.

12. A system in accordance with claim 11, wherein said system further comprises an electric rotating device configured to rotate the plurality of blades.

13. A system in accordance with claim 12, wherein said system further comprises a test probe sized for insertion through said spacer passage to facilitate preventing said probe from contacting the plurality of blades.

14. A system in accordance with claim 8, wherein said system further comprises a computer system coupled in communication with said control unit, said computer system configured to:
receive at least one record from the control unit; and
determine blade tip clearance data based on the at least one record.

* * * * *